(12) United States Patent
Suzuki et al.

(10) Patent No.: US 9,248,786 B2
(45) Date of Patent: Feb. 2, 2016

(54) BOARD STRUCTURE FOR VEHICLE AND MANUFACTURING METHOD OF THE SAME

(75) Inventors: Kiichiro Suzuki, Nagoya (JP); Takaaki Sugita, Nagoya (JP)

(73) Assignee: HAYASHI ENGINEERING, Nagoya (JP)

( * ) Notice: Subject to any disclaimer, the term of this patent is extended or adjusted under 35 U.S.C. 154(b) by 914 days.

(21) Appl. No.: 13/381,573

(22) PCT Filed: Jun. 28, 2010

(86) PCT No.: PCT/JP2010/060941
§ 371 (c)(1),
(2), (4) Date: Dec. 29, 2011

(87) PCT Pub. No.: WO2011/001924
PCT Pub. Date: Jan. 6, 2011

(65) Prior Publication Data
US 2012/0100337 A1 Apr. 26, 2012

(30) Foreign Application Priority Data
Jul. 1, 2009 (JP) .................................. 2009-156835

(51) Int. Cl.
*B32B 3/12* (2006.01)
*B60R 13/00* (2006.01)
(Continued)

(52) U.S. Cl.
CPC ............. *B60R 13/013* (2013.01); *B29C 44/128* (2013.01); *B29C 44/1209* (2013.01); *B29C 44/1228* (2013.01); *B29C 44/18* (2013.01); *B29C 70/46* (2013.01); *B29D 99/0021* (2013.01); *B32B 3/12* (2013.01);
(Continued)

(58) Field of Classification Search
CPC ........................ B60R 13/013; B29C 2043/022
USPC ................................ 160/230, 232; 296/97.23
See application file for complete search history.

(56) References Cited

U.S. PATENT DOCUMENTS 3,890,108 A * 6/1975 Welsh ........................... 428/116
4,330,494 A * 5/1982 Iwata et al. .................... 428/117
(Continued)

FOREIGN PATENT DOCUMENTS

EP  0860574 A2  8/1998
GB  1467766 A * 3/1977
(Continued)

OTHER PUBLICATIONS

Extended European Search Report issued Sep. 5, 2013 in corresponding EP Application No. 107940 93.4.

*Primary Examiner* — David Sample
*Assistant Examiner* — Nicholas W Jordan
(74) *Attorney, Agent, or Firm* — Knobbe Martens Olson & Bear LLP (57) ABSTRACT

Provided is a board structure for a vehicle, which includes a durable hinge portion while light weight and high rigidity of the board structure are maintained. The board structure includes: hinge portion 11 formed by squashing a part of honeycomb structure 14 that is charged with thermosetting resin 16 the from back side surface member 15 side toward front side surface member 13, in which front side surface member 13 and back side surface member 15 are joined to each other, and flexible hinge sheet 12 provided on the outer side of front side surface member 13 across hinge portion 11. At least a part of hinge sheet 12 in a thickness direction thereof is embedded in front side surface member 13.

6 Claims, 4 Drawing Sheets

(51) Int. Cl.
  *B60R 13/01* (2006.01)
  *B29C 70/46* (2006.01)
  *B29D 99/00* (2010.01)
  *B32B 5/02* (2006.01)
  *B32B 5/26* (2006.01)
  *B32B 27/12* (2006.01)
  *B32B 3/28* (2006.01)
  *B29C 44/12* (2006.01)
  *B29C 44/18* (2006.01)
  *B29C 37/00* (2006.01)
  *B29C 43/02* (2006.01)

(52) U.S. Cl.
  CPC ............... *B32B 3/28* (2013.01); *B32B 5/022* (2013.01); *B32B 5/26* (2013.01); *B32B 27/12* (2013.01); *B29C 37/0057* (2013.01); *B29C 2043/022* (2013.01); *B32B 2260/023* (2013.01); *B32B 2262/0284* (2013.01); *B32B 2262/06* (2013.01); *B32B 2307/718* (2013.01); *B32B 2605/00* (2013.01); *Y10T 428/24149* (2015.01)

(56) References Cited

U.S. PATENT DOCUMENTS

| | | | |
|---|---|---|---|
| 5,915,445 A | 6/1999 | Rauenbusch | |
| 5,919,545 A * | 7/1999 | Giezendanner et al. | 428/116 |
| 2005/0189674 A1* | 9/2005 | Hochet et al. | 264/138 |
| 2007/0178794 A1* | 8/2007 | Nishio et al. | 442/394 |
| 2008/0086965 A1* | 4/2008 | Metz et al. | 52/309.9 |

FOREIGN PATENT DOCUMENTS

| | | |
|---|---|---|
| GB | 2335232 A | 9/1999 |
| JP | 03-109145 | 9/1991 |
| JP | 07-081628 | 3/1995 |
| JP | 2000170371 A * | 6/2000 |
| JP | 2001-098831 A | 4/2001 |
| JP | 2001-158032 A | 6/2001 |
| JP | 2004-322831 A | 11/2004 |
| JP | 2008-239086 A | 9/2008 |
| JP | 2009039967 A * | 2/2009 |

* cited by examiner

BOARD STRUCTURE FOR VEHICLE AND MANUFACTURING METHOD OF THE SAME

CROSS-REFERENCE TO RELATED APPLICATIONS

This application is the U.S. National Phase under 35. U.S.C. §371 of International Application PCT/JP2010/060941, filed Jun. 28, 2010, which claims priority to Japanese Patent Application No. 2009-156835, filed Jul. 1, 2009. The International Application was published under PCT Article 21(2) in a language other than English

TECHNICAL FIELD

The present invention relates to a board structure for a vehicle which is provided in an interior space of an automobile, and specifically relates to a board structure for a vehicle which is molded by charging a thermosetting resin in a honeycomb structure constituting a core, and has a hinge portion, and a manufacturing method of the same.

BACKGROUND ART

Various types of board structures are known for interior automotive trims, such as, for example, a deck board disposed on a floor of a trunk space in which a recessed storage portion for storing spare tires is formed and a parcel shelf for dividing trunk space into an upper space and a lower space, in the interior space of an automobile. For these types of board structures, a predetermined load bearing capability is required, and also, weight reduction is becoming increasingly important from the perspective of the handleability of the board structures and fuel consumption reduction of the vehicles.

For such lightweight boards, there are known boards in which a honeycomb structure is used as a base material, the honeycomb structure including a plurality of small individual chambers (cells) therein, the boards having reduced weight and enhanced rigidity by charging and foaming a foamable thermosetting resin in the cells of the honeycomb structure.

For example, Patent Literature 1 discloses a board structure for the interior automotive trim, the board structure being formed by putting a glass fiber mat impregnated with a foamable thermosetting resin on each of opposite sides of a honeycomb structure, and subjecting the resulting honeycomb structure with the glass fiber mats thereon to heat molding, thereby foaming and charging the thermosetting resin in the cells of the honeycomb structure. In addition, Patent Literature 2 discloses a floor covering member for the trunk space of an automobile, the floor covering member including integral hinges formed by thermofusion of a honeycomb layer.

A deck board disposed on a floor of a trunk space in an automobile is intended to enable opening/closing an opening of a recessed storage portion, and to provide a flat floor surface of the trunk space. Since such deck board is formed so as to cover substantially the entire floor surface of the trunk space, it is necessary to open/close the deck board in its entirety in order to access the recessed storage portion. Accordingly, when opening/closing the deck board in its entirety, it is necessary to temporarily take goods loaded on the deck board to the outside of the vehicle, and thus, such deck board is poor in handleability and convenience. Therefore, in order to enhance the convenience of deck boards, a configuration in which a deck board is divided by forming a hinge so that a part of the deck board can pivot with reference to the hinge as a pivot axis, thus enabling opening/closing of only a part of an opening of a recessed storage portion, is employed.

CITATION LIST

Patent Literature

Patent Literature 1: JP 2559276 B (Japanese Patent Application No. 1-244760)
Patent Literature 2: JP 3237341 B (Japanese Patent Application No. 5-250938)

SUMMARY OF INVENTION

Technical Problem

As a method for forming a hinge in a deck board such as described above, a method in which a plurality of divisional boards is formed, the respective divisional boards are joined by covering the divisional boards by a skin member so that the skin member is foldable at the joining part is known. As a result, the board is configured to be foldable via a skin hinge formed at the joining part, which is a part of the skin member.

However, such hinge forming method in which a skin member is attached afterward requires a board to be divided into a plurality of divisional boards, inevitably lowering the rigidity of the core included in the divisional boards, inconveniently resulting in an increase in the amount of bending of the board that occurs when goods are loaded on the board.

Thus, it is necessary to increase a basis weight of the core included in the board and/or add a reinforcing member with a relatively high rigidity such as a metal member, unfavorably resulting in an increase in weight of the board structure for a vehicle as well as an increase in the number of manufacturing steps and manufacturing cost. Furthermore, the latter step in which a skin member is attached to the divisional boards requires consideration of positioning of the boards relative to the skin member and of dimension errors of the boards, also unfavorably resulting in an increase in the number of manufacturing steps and complexity of the steps.

Furthermore, although a board structure for a vehicle can be formed by forming a plurality of divisional boards and joining the boards by attaching a hinge part therebetween, even with such a configuration, it is difficult to avoid a decrease in rigidity of the board and an increase in the number of manufacturing process steps and manufacturing cost.

Furthermore, although with the configuration of Patent Literature 2, hinges can be formed without dividing a board into a plurality of divisional boards, each of cells of the honeycomb layer included in the board has a hollow space, resulting in the problem of poor rigidity.

Therefore, for a board structure for a vehicle which uses a honeycomb structure as a core, it is desirable to use a board having reduced weight and enhanced rigidity that results from charging and foaming a thermosetting resin impregnated in surface members, in hollow spaces of cells of the honeycomb structure, which are stacked on opposite sides of the honeycomb structure, simultaneously with heat molding of the board structure for a vehicle as in Patent Literature 1.

As described above, for a board structure for a vehicle which is formed by charging and foaming a foamable thermosetting resin in cells of a honeycomb structure, a foldable hinge can be formed by performing squashing processing simultaneous with molding of the board structure to squash a part of a core and join surface members stacked on opposite sides of the core.

However, when forming a hinge with such method, a hinge portion formed by subjecting a part of a core to squashing processing is difficult to fold because the charged thermosetting resin has been cured, and thus, has the problem in which it lacks a hinging capability.

Furthermore, a hinge portion with thermosetting resin cured therein is so brittle that cracking may occur when the hinge portion is folded. Where cracking occurs in the hinge portion, the molded board structure for a vehicle is ruptured at the hinge portion. Thus, the molded board structure for a vehicle does not provide a hinging capability and in addition, loses a function as a board structure for a vehicle, resulting in a defective product.

Therefore, an object of the present invention is to provide a board structure for a vehicle which is formed by charging and foaming a thermosetting resin in hollow spaces of a honeycomb structure, the board structure including a durable hinge portion while light weight and high rigidity of the board structure are maintained. Another object of the present invention to provide a method for manufacturing a board structure for a vehicle which enables formation of a hinge portion having a good hinging capability during molding of the board structure for a vehicle.

Solution to Problem

In order to achieve the above objects, a board structure for a vehicle according to the present invention includes a core having a honeycomb structure, a front side surface member and a back side surface member between which the core is sandwiched so that the front side surface member and the back side surface member cover openings of hollow spaces of the honeycomb structure of the core, and a thermosetting resin foamed and charged in the hollow spaces of the core, the board structure comprising: a hinge portion formed by squashing a part of the core charged with the thermosetting resin from a side of the back side surface member toward the front side surface member, in which the front side surface member and the back side surface member are joined to each other; and a flexible hinge sheet provided across the hinge portion outside the front side surface member. At least a part of the hinge sheet in a thickness direction thereof is embedded in the front side surface member.

The board structure for a vehicle according to the present invention configured as described above is formed by charging and foaming the thermosetting resin in the hollow spaces of the honeycomb structure constituting the core, providing weight reduction as well as a predetermined load bearing capability to the board structure for a vehicle. In addition, the hinge portion of the board structure for a vehicle has the hinging capability provided by the hinge sheet, thus enabling the board structure to be favorably pivoted with the hinge portion as a pivot axis. Even if parts of the respective surface members covering the hinge portion are damaged as a result of the cured thermosetting resin being broken or ruptured when the board structure is folded at the hinge portion, the provision of the flexible hinge sheet prevents loss of the good hinging capability.

Furthermore, the hinge sheet may be configured to include a flexible base material resin sheet, and a heat-insulating nonwoven fabric provided at a surface of the base material resin sheet on a side opposite to a side facing the front side surface member. This configuration is preferable because when the board structure for a vehicle is heat-molded, defective molding is prevented, such that the base material resin sheet melts, and the melt resin adheres to molding dies for the board structure for a vehicle.

Furthermore, the base material resin sheet may be configured to include a thermoplastic resin having a basis weight of no less than 50 g/m$^2$ and no more than 500 g/m$^2$. This configuration enables the hinge portion to have a good hinging capability while the mechanical strength and durability of the hinge portion are well maintained.

Furthermore, The board structure for a vehicle such that on a surface of the base material resin sheet opposite to the side on which the heat-insulating nonwoven fabric is stacked, an adhesive nonwoven fabric is provided for adherence to the front side surface member. This configuration is preferable because the adhesive nonwoven fabric is arranged between the base material resin sheet and the front side surface member, and thereby the base material resin sheet and the front side surface member tightly adhere to each other by means of the anchoring effect of the adhesive nonwoven fabric.

Furthermore, the hinge portion may be configured to include a notched groove formed at a surface of the back side surface member, in parallel to a direction of a pivot axis of the hinge portion. This configuration is preferable because the formation of the notched groove at the surface of the back side surface member prevents, to the greatest possible extent, the front side surface member and the back side surface member from being ruptured when providing a crease to the hinge portion.

Furthermore, a method for manufacturing a board structure for a vehicle according to the present invention includes: arranging a core having a honeycomb structure, and a front side surface member and a back side surface member that are impregnated with a thermosetting resin, between a pair of molding dies in such a manner that the core is interposed between the front side surface member and the back side surface member so as to cover openings of hollow spaces of the honeycomb structure;

heating the front side surface member and the back side surface member through the molding dies, thereby foaming and charging the thermosetting resin impregnated in the front side surface member and the back side surface member in the hollow spaces of the core; and performing squashing processing on a part of the core impregnated with the thermosetting resin from a side of the back side surface member toward the front side surface member, using the molding dies, thereby joining the front side surface member and the back side surface member to each other, thereby forming a hinge portion, wherein the hinge portion is formed so as to arrange a flexible hinge sheet across the hinge portion at a position on an outer side of the front side surface member where the hinge portion is formed, and at least a part of the hinge sheet in a thickness direction thereof is embedded in the front side surface member.

Advantageous Effects of Invention

The board structure for a vehicle according to the present invention enables provision of a durable hinge portion while light weight and high rigidity of the board structure are maintained. Also, the method for manufacturing a board structure for a vehicle according to present invention enables formation of a hinge portion having a good hinging capability during molding of the board structure for a vehicle, thus enabling reduction in manufacturing costs.

DESCRIPTION OF EMBODIMENTS

Hereinafter, specific embodiments of the present invention will be described with reference to the drawings.

First Embodiment

Figure 1:
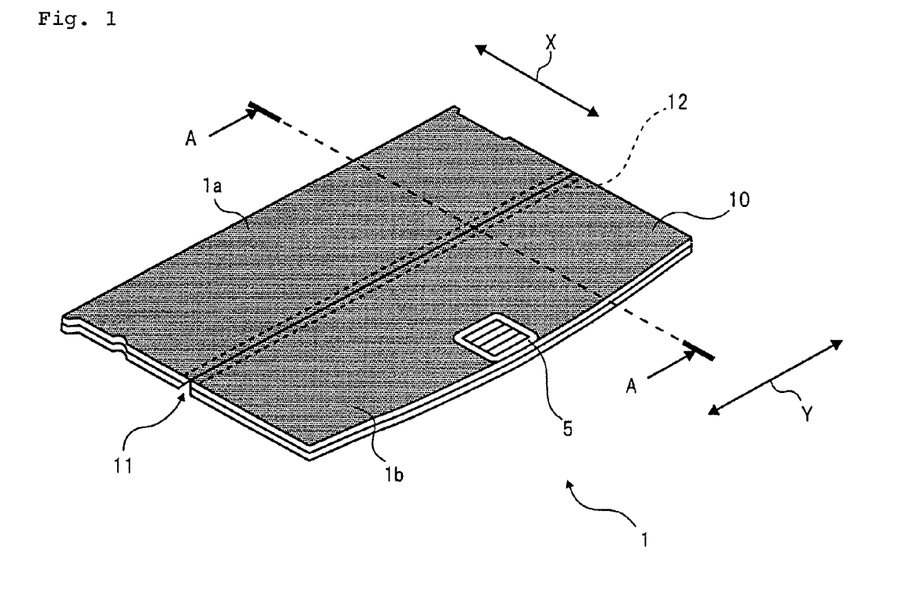
FIG. 1 is a perspective diagram illustrating a board structure for a vehicle according to a first embodiment which is applied to a deck board placed on a floor surface of trunk space in a rear portion of an automobile.

FIG. 1 is a perspective diagram illustrating a deck board (floor board) as an embodiment placed on a floor surface of the trunk space of a rear portion of an automobile, to which a board structure for a vehicle according to the present invention is applied. Deck board 1 according to the embodiment covers an opening of a storage portion provided below the floor of the trunk space, thereby providing a flat floor surface of the trunk space, enabling goods to be loaded on the deck board, and a part of deck board 1 is configured so as to pivot, providing access to the storage portion below the floor of the trunk space.

Deck board 1 has an outer shape substantially corresponding to the shape of the floor surface of the trunk space, which is a position in the automobile where deck board 1 is placed. Skin member 10 is stacked on the surface of deck board 1 facing the inside of the trunk space, and provides a design and texture suitable for an interior automotive trim.

For skin member 10, a needlepunched nonwoven fabric composed of a polyester fiber with a basis weight of no less than 100 g/m² and no more than 300 g/m² is preferably used; however, skin member 10 is not limited to this, and a nonwoven fabric composed of any of various types of thermoplastic resin fibers such as polypropylene fibers and polyethylene fibers can be used for skin member 10 instead of the needlepunched nonwoven fabric.

Deck board 1 includes hinge portion 11 provided at a substantial center position in an X direction in FIG. 1, which is a longitudinal direction of the automobile. Deck board 1 is divided to front board 1a and rear board 1b via hinge portion 11. Furthermore, handle portion 5 is attached to rear board 1b, thus allowing the user to cause rear board 1b pivot with hinge portion 11 as a pivot axis by griping handle portion 5 and lifting up rear board 1b. Consequently, rear board 1b pivots with hinge portion 11 as a pivot axis by lifting only rear board 1b, without lifting up deck board 1 in its entirety, thus enabling goods to be put/taken into/from the storage portion below the floor of the trunk space. Thus, deck board 1 provides a highly convenient deck board that reduces difficulty to the user when storing goods in the storage portion.

A core of deck board 1 according to this embodiment has a honeycomb structure including a plurality of individual cells therein. For this type of honeycomb structure, e.g., a paper honeycomb of, e.g., a cardboard, a plastic honeycomb of, e.g., polypropylene, or a metal honeycomb of, e.g., aluminum, can be used; however, from the perspective of weight reduction, it is preferable to use a paper honeycomb.

Furthermore, the honeycomb structure preferably has a basis weight of no less than 100 g/m² and no more than 2000 g/m², more preferably, no less than 500 g/m² and no more than 1500 g/m². With a basis weight equal to or higher than the above lower limit, the degree of rigidity and durability that is required for the deck board of the automobile can be provided. With a basis weight equal to or lower than the above upper limit, a significant weight reduction effect can be provided compared to conventional deck boards.

In this embodiment, a paper honeycomb including a cardboard ("Feather Core F-V" manufactured by Shin Nippon Feather Core Co., Ltd.) is used for the honeycomb structure.

Figure 2A:
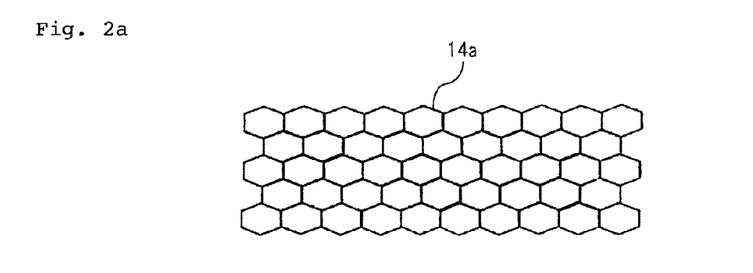
FIG. 2a is a plan diagram illustrating an example configuration of a honeycomb structure used for a core in this embodiment.
Figure 2B:
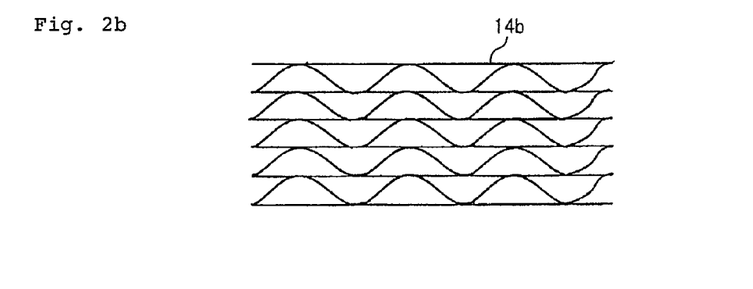
FIG. 2b is a plan diagram illustrating an example configuration of a honeycomb structure used for a core in this embodiment.

FIGS. 2a and 2b are plan diagrams each illustrating an example of such a honeycomb structure. FIG. 2a illustrates known honeycomb structure 14a including a plurality of cells arranged adjacent to one another, each having a hexagonal cross section. FIG. 2b illustrates known honeycomb structure 14b in which flat plate-like partition walls and corrugated partition walls are alternately stacked on one another so that each corrugated partition wall winds between flat plate-like partition walls with a fixed space therebetween.

The honeycomb structure constituting the core of the deck board according to this embodiment is not limited to honeycomb structures 14a and 14b illustrated in FIGS. 2a and 2b. A honeycomb structure having another shape can be employed instead of honeycomb structures 14a and 14b as long as such honeycomb structure includes a plurality of individual cells, the cells opening outward at each of opposite surfaces (an upper surface and a lower surface) of the plate-like honeycomb structure.

Figure 3:
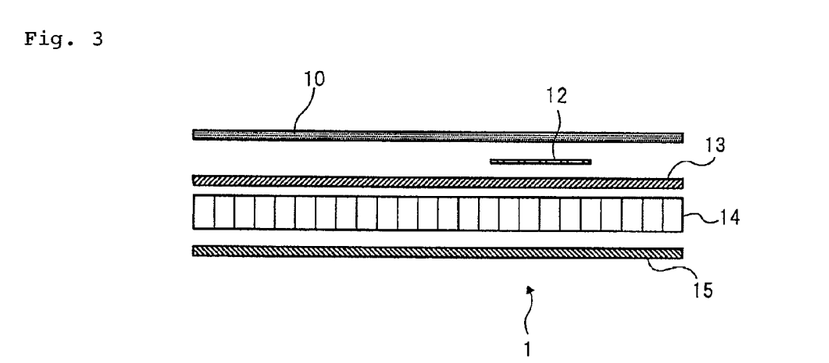
FIG. 3 is an exploded cross-sectional diagram illustrating a board structure for a vehicle according to the first embodiment.

FIG. 3 is an exploded cross-sectional diagram taken along line A-A in FIG. 1, which illustrates respective components in such a manner that the components are separated from one another in order to illustrate a layer stacking state before deck board 1 is formed. As illustrated in FIG. 3, deck board 1 includes skin member 10, hinge sheet 12, front side surface member 13, honeycomb structure 14 and back side surface member 15, which are stacked in this order. Furthermore, skin member 10, front side surface member 13, honeycomb structure 14 and back side surface member 15 are formed so as to have substantially the same plane area. Furthermore, hinge sheet 12 is formed so as to have substantially the same length in a Y direction in FIG. 1, which is the width direction of the vehicle, as skin member 10, front side surface member 13, honeycomb structure 14 and back side surface member 15, and extends in only a part of the area in an X direction.

For front side surface member 13 and back side surface member 15, glass fiber mats are preferably used because of their light weight and excellent heat insulating properties. Also, for front side surface member 13 and back side surface member 15, various fiber mats, which are natural fiber mats such as plant fiber mats, may be used.

Front side surface member 13 and back side surface member 15 in this embodiment are impregnated with a foamable thermosetting resin, using any of various methods such as spraying or immersion. For the thermosetting resin, an urethane resin is preferably used because an urethane resin does not involve generation of a volatile organic compound (VOC); however, any of various types of thermosetting resins such as phenolic resins, melamine resins and urea resins can be employed instead of urethane resins.

The amount of content of the thermosetting resin is preferably made to fall in a range of no less than 100 wt. % and no more than 1000 wt. % relative to the weight of each of front side surface member 13 and back side surface member 15. It is preferable when the amount of content of the thermosetting resin is equal to or higher than the above lower limit, because a sufficient amount of thermosetting resin that is charged in hollow spaces of honeycomb structure 14 is provided to enable deck board 1 to provide the required rigidity. Furthermore, It is preferable when an amount of content of the thermosetting resin is equal to or lower than the above upper limit, because deck board 1 can have reduced weight compared to that of conventional deck boards and an increase in manufacturing cost resulting from use of an excessive amount of thermosetting resin can be prevented.

In this embodiment, as a method for impregnating front side surface member 13 and back side surface member 15 with an urethane resin, spraying an urethane resin with a spray is employed.

As a method for impregnating surface members with a thermoplastic resin, any of various types of known impregnation methods such as application and immersion, as well as spraying, can be used.

Since deck board 1 in this embodiment is a board structure in which the opposite sides of honeycomb structure 14 are sandwiched between front side surface member 13 and back side surface member 15, deck board 1 includes a plurality of hollow cells in honeycomb structure 14 made of a cardboard. Thus, deck board 1 can be configured so as to have an extremely small weight relative to conventional deck boards of this type. Furthermore, honeycomb structure 14 is provided between front side surface member 13 and back side surface member 15 so that openings of the hollow spaces at the opposite surfaces of honeycomb structure 14 are covered by front side surface member 13 and back side surface member 15. Consequently, front side surface member 13 and back side surface member 15 receive a force imposed on deck board 1 and distribute the force over the entire partition walls of honeycomb structure 14. As a result, high pressure resistance and high mechanical strength in the thickness direction of deck board 1, which is difficult to provide by means of a board structure using only a honeycomb structure made of a cardboard as a core, can be provided.

In a method for manufacturing deck board 1 according to this embodiment, honeycomb structure 14 including a plurality of cells partitioned by the partition walls is used as a core, the opposite surfaces of honeycomb structure 14 are sandwiched by front side surface member 13 and back side surface member 15 that are impregnated with the thermosetting resin, and front side surface member 13 and back side surface member 15 stacked on honeycomb structure 14 are heated so as to be formed into a single piece. Here, the thermosetting resin with which front side surface member 13 and back side surface member 15 are impregnated is foamed by heating, simultaneously with the pressure forming of deck board 1, and charged in the hollow spaces of the cells of honeycomb structure 14. Consequently, deck board 1 having reduced weight and a high rigidity can be formed.

Thermosetting resin 16 foamed and charged in the hollow spaces of the cells of honeycomb structure 14 is continuously heated through forming dies 3a and 3b and thereby cured. Consequently, front side surface member 13 and honeycomb structure 14 adhere to each other and back side surface member 15 and honeycomb structure 14 also adhere to each other. As a result of foaming and charging thermosetting resin 16 in the hollow spaces of honeycomb structure 14, properties, such as the mechanical strength and pressure resistance of deck board 1, are further enhanced.

Figure 4:
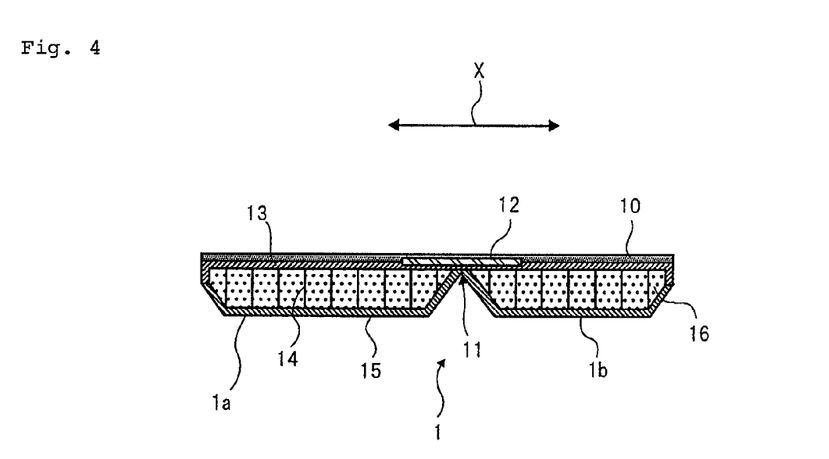
FIG. 4 is a cross-sectional diagram of the board structure for a vehicle, taken along line A-A.

FIG. 4 is a cross-sectional diagram along the X direction of deck board 1. As a result of thermosetting resin 16 with which front side surface member 13 and back side surface member 15 are impregnated being foamed and charged in honeycomb structure 14, the respective partition walls of honeycomb structure 14 are covered and thereby reinforced by foaming of thermosetting resin 16, and front side surface member 13 and honeycomb structure 14 tightly adhere and are secured to each other, and honeycomb structure 14 and back side surface member 15 tightly adhere and are secured to each other. Thus, the mechanical strength and rigidity that are required for a deck board provided on the floor surface of trunk space of a vehicle can be met, as well as significant weight reduction can be achieved compared to conventional deck boards.

Here, thermosetting resin 16, which is foamed and charged, does not necessarily have to be foamed until thermosetting resin 16 completely fills each of the hollow spaces of the cells of honeycomb structure 14. In other words, it is only necessary that an amount of foam that is sufficient for front side surface member 13 and back side surface member, 15 to adhere to honeycomb structure 14 and for thermosetting resin 16 to partially cover the respective partition walls of the cells of honeycomb structure 14 be provided, which also enables realization of the effects of the present invention.

The amount of foamed and charged thermosetting resin 16 is preferably a percentage that is no less than 5% and no more than 80%, more preferably, no less than 10% and no more than 60%, relative to the volume of each cell of honeycomb structure 14.

When the amount of foamed and charged thermosetting resin 16 is larger than the above lower limit, the required amount of rigidity and durability can be provided. When an amount of foamed and charged thermosetting resin 16 is smaller than the above upper limit, a sufficient weight reduction effect can be realized for deck board 1.

(Hinge Portion)

Figure 5:
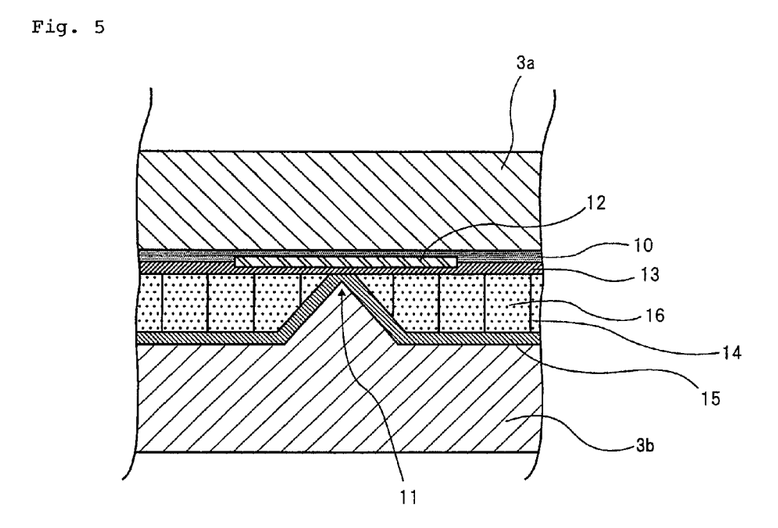
FIG. 5 is an enlarged cross-sectional diagram illustrating a part around a hinge portion formed by molding dies in the board structure for a vehicle according to the first embodiment.

Next, the structure of hinge portion 11 will be described. FIG. 5 is an enlarged cross-sectional diagram illustrating hinge portion 11 in a cross-sectional diagram illustrating the state in which a stack including skin member 10, hinge sheet 12, front side surface member 13, honeycomb structure 14 and back side surface member 15, arranged between the pair of forming dies 3a and 3b, is being subjected to pressing.

Hinge portion 11 is formed by performing squashing processing including compressing and thereby squashing a part of honeycomb structure 14 from the back side surface member 15 side toward front side surface member 13 simultaneously with pressure forming of deck board 1, and by joining back side surface member 15 and front side surface member 13 to each other.

Although in this embodiment, as illustrated in FIG. 5, the pressure forming of deck board 1 is performed with skin member 10 stacked on front side surface member 13, skin member 10 may be attached to a formed body including components other than skin member 10 in a step after the forming step, or deck board 1 may be configured not to include skin member 10.

A board structure having a honeycomb sandwich structure in which a honeycomb structure of this type is sandwiched between two surface members, using a thermosetting resin, is known. In such a conventional board structure, a back side surface member and a front side surface member are impregnated with thermosetting resin, the back side surface member and the front side surface member are heated and subjected to pressure forming, thereby the thermosetting resin is charged in hollow spaces of the honeycomb structure and cured. Thus, in such a conventional board structure, when a hinge portion is formed, the hinge portion has poor flexibility, and thus, after the forming, it is difficult to fold the board structure with the hinge portion as a pivot axis, or when the board structure is folded via the hinge portion, the board structure is ruptured from that part, and thus, hinging capability cannot be provided.

For the present invention, the present inventors repeated research and experiment earnestly in order to solve such problem. As a result, the present inventors found out that the arrangement of hinge sheet 12 using a thermoplastic resin as a base material across hinge portion 11 on the front side surface member 13 side of hinge portion 11 of deck board 1 enables formation of hinge portion 11 having a good hinging capability simultaneously with pressure forming of deck board 1 even in the case of a lightweight board formed by foaming and charging thermosetting resin 16 in honeycomb structure 14, and achieved the present invention.

Accordingly, as illustrated in FIG. 3, hinge sheet 12 is arranged on an outer side of front side surface member 13, that is, between front side surface member 13 and skin member 10. Also, hinge sheet 12 has a length substantially equal to the width of deck board 1 in the Y direction, which is the width direction of the vehicle, and thus is arranged over hinge portion 11 along the Y direction. The width in the X direction of hinge sheet 12 is required to have a dimension enabling arrangement of hinge sheet 12 across a foldable part, which forms hinge portion 11 where front side surface member 13 and back side surface member 15 are joined to each other. The width of hinge sheet 12 is preferably around 10 to 300 mm.

Figure 6:
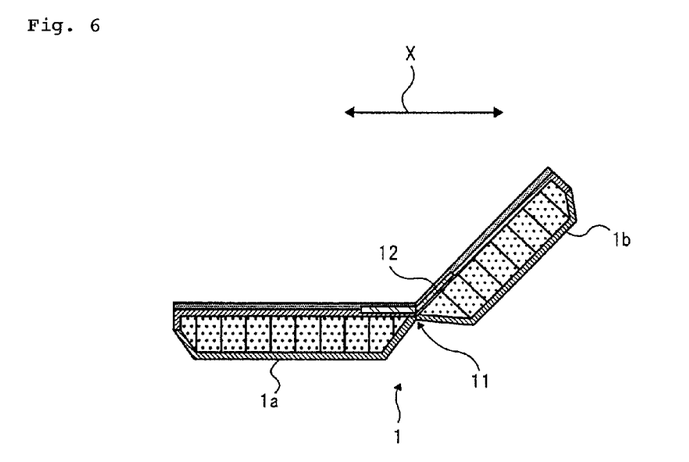
FIG. 6 is a cross-sectional diagram illustrating the board structure for a vehicle with a rear board thereof lifted up by pivoting the rear board with the hinge portion as a pivot axis.

As illustrated in FIG. 6, as a result of hinge sheet 12 being provided over deck board 1 along the Y direction, hinge portion 11 has the hinging capability provided by hinge sheet 12. Thus, rear board 1b of deck board 1 can pivot with hinge portion 11 as a pivot axis by lifting up rear board 1b. Even if cured thermosetting resin 16 with which front side surface member 13 and back side surface member 15 are impregnated is cracked or ruptured when deck board 1 is folded via hinge portion 11, and consequently, even if parts of respective surface members 13 and 15 that cover hinge portion 11 are damaged, good hinging capability is not lost because of the provision of hinge sheet 12 that uses a flexible thermoplastic resin as a base material.

Furthermore, in deck board 1, at least a part of hinge sheet 12 in the thickness direction thereof is embedded in front side surface member 13. This structure is provided by performing pressure forming (hot press forming) of deck board 1 with hinge sheet 12 stacked at a position where hinge portion 11 is formed. Preferably no less than 40% of hinge sheet 12 in the thickness direction thereof is configured to be embedded in front side surface member 13, and more preferably no less than 70% of hinge sheet 12 in the thickness direction thereof is configured to be embedded in front side surface member 13. As a result of providing a stack in which at least a part of hinge sheet 12 in the thickness direction thereof is embedded in front side surface member 13, it is possible to prevent, to the greatest possible extent, the surface of front side surface member 13 from being recessed and/or projected by hinge sheet 12. Accordingly, a good outer appearance of hinge portion 11 of deck board 1 can be maintained.

(Hinge Sheet)

Figure 7:
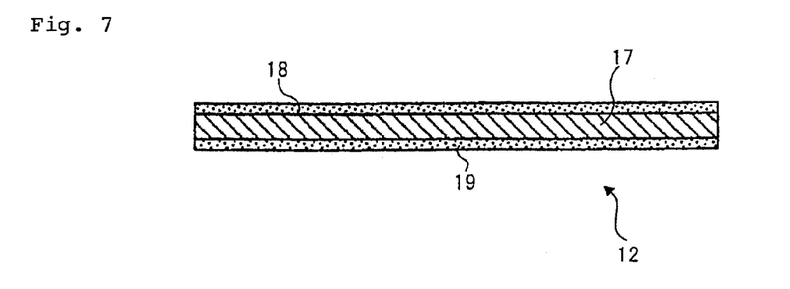
FIG. 7 is a cross-sectional diagram illustrating a hinge sheet in this embodiment.

Next, the structure of hinge sheet 12 will be described. FIG. 7 is a cross-sectional diagram of hinge sheet 12. Hinge sheet 12 includes base material resin sheet 17 composed of a thermoplastic resin such as, for example, polypropylene or polyethylene, heat-insulating nonwoven fabric 18 stacked on the skin member 10 side of base material resin sheet 17, nonwoven fabric 18 composed of, e.g., a PET spunbond nonwoven fabric, and adhesive nonwoven fabric 19 stacked on the surface on the honeycomb structure 14 side of base material resin sheet 17, adhesive nonwoven fabric 19 composed of, e.g., a PET spunbond nonwoven fabric.

For base material resin sheet 17 included in hinge sheet 12, a flexible thermoplastic resin is preferably used, and the flexible thermoplastic resin preferably has a basis weight of no less than 50 g/m² and no more than 500 g/m², and the flexible thermoplastic resin more preferably has a basis weight of no less than 70 g/m² and no more than 150 g/m² because the basis weight in such a range preferably enables suppression of an increase in weight while the mechanical strength of hinge portion 11 is provided.

Heat-insulating nonwoven fabric 18 preferably has a basis weight of no less than 30 g/m². This is because during pressure forming of deck board 1 involving heating, a failure may occur during forming of hinge portion 11 as a result of, e.g., the temperature of base material resin sheet 17 being increased, base material resin sheet 17 melting, and the melted resin adhering to forming die 3a and 3b. The arrangement of heat-insulating nonwoven fabric 18 provides a heat-insulating effect, enabling reduction of the possibility of occurrence of a failure during forming due to the melting of base material resin sheet 17.

Adhesive nonwoven fabric 19 preferably has a basis weight of no less than 30 g/m². Base material resin sheet 17 composed of a thermoplastic resin and front side surface member 13 impregnated with thermosetting resin 16 are poorly adhere to each other, and thus, base material resin sheet 17 cannot be adhere directly to front side surface member 13. Therefore, hinge sheet 12 in this embodiment is provided with adhesive nonwoven fabric 19 on the front side surface member 13 side of base material resin sheet 17, thereby enabling a sufficient adhesive property to be provided using the anchoring effect provided by adhesive nonwoven fabric 19.

Example

The following materials were used for making a hinge sheet of Example: a polypropylene resin sheet having a basis weight of 100 g/m² was used for base material resin sheet 17, a PET spunbond nonwoven fabric having a basis weight of 100 g/m² was used for heat-insulating nonwoven fabric 18, and a PET spunbond nonwoven fabric having a basis weight of 30 g/m² was used for adhesive nonwoven fabric 19.

Comparative Examples

As Comparative Example 1, a hinge sheet composed of only a PET spunbond nonwoven fabric having a basis weight of 200 g/m² was fabricated, and the hinge sheet was stacked at a position on a surface of the front side surface member, the position corresponding to a position where the hinge portion is formed.

As Comparative Example 2, a hinge sheet composed of only a jute woven fabric having a basis weight of 200 g/m² was fabricated, and the hinge sheet was stacked at a position on a surface of the front side surface member, the position corresponding to a position where a hinge portion is formed.

As Comparative Example 3, a hinge sheet was fabricated by performing latex processing on a surface of a sheet composed of a PET plain needlepunched nonwoven fabric having a basis weight of 100 g/m² so as to have a basis weight of 30 g/m², and as in Comparative Examples 1 and 2, the sheet was stacked on the front side surface member in such a manner that the surface of the sheet on which the latex processing was performed faces the front side surface member.

A deck board was formed using the hinge sheet according to each of Comparative Examples 1 to 3, a thermosetting resin with which the front side surface member was impregnated seeped into the entire hinge sheet, and the thermosetting resin was cured in that state. Therefore, when a deck board that uses the hinge sheet according to each of Comparative Examples 1 to 3 was repeatedly folded via the hinge portion, the deck board was ruptured together with the hinge sheet.

Meanwhile, the hinge sheet according to Example uses a polypropylene resin sheet, which is a thermoplastic resin, for the base material resin sheet, a thermosetting resin with which front side surface member 13 is impregnated did not seep into the polypropylene resin sheet, thereby enabling provision of hinge portion 11 with a good hinging capability in formed deck board 1.

(Deck Board Manufacturing Method)

Front side surface member 13 and back side surface member 15 are impregnated with thermosetting resin 16 in advance by evenly spraying thermosetting resin 16 onto front side surface member 13 and back side surface member 15 using, e.g., a sprayer. Front side surface member 13 and back side surface member 15 are stacked on opposite sides of honeycomb structure 14 so as to sandwich honeycomb structure 14 therebetween in such a manner that side surface member 13 and back side surface member 15 cover openings of hollow spaces of honeycomb structure 14. Furthermore, hinge sheet 12 is mounted on the upper surface of front side surface member 13, and the stack in this state is set between a pair of forming dies 3a and 3b. Then, forming dies 3a and 3b are heated to have a surface temperature of around 130° C. to 150° C., which is a temperature sufficient for foaming and curing thermosetting resin 16, and in that state, the stack of honeycomb structure 14, front side surface member 13, back side surface member 15 and hinge sheet 12 are subjected to hot press forming by forming dies 3a and 3b. Consequently, deck board 1 including hinge portion 11 is formed.

As described above, in deck board 1 according to this embodiment, providing hinge portion 11 with hinge sheet 12 on the outer side of front side surface member 13 enables formation of highly durable hinge portion 11 while mechanical characteristics of deck board 1, such as light weight and high rigidity, are maintained.

Furthermore, the method for manufacturing deck board 1 enables formation of hinge portion 11 that has a favorable hinging capability by performing squashing processing during the forming of deck board 1, without requiring, for example, a step of adhering a skin member to a deck board after forming the deck board or without requiring a step of attaching a hinge part to a deck board. Accordingly, this manufacturing method enables reduction in manufacturing costs.

Furthermore, in deck board 1, a part of hinge sheet 12 in the thickness direction thereof is embedded in front side surface member 13, and the occurrence of recesses and/or projections formed by hinge sheet 12 on the surface of front side surface member 13 is thereby suppressed, thus enabling hinge portion 11 to keep a good outer appearance.

Second Embodiment

Next, a deck board according to a second embodiment will be described with reference to the drawings. The deck board according to the second embodiment is different from that of the first embodiment only as regards the configuration of the hinge portion. In the second embodiment, components that are the same as those of the first embodiment are provided with reference numerals that are the same as those of the first embodiment, and a description thereof will be omitted.

Figure 8:
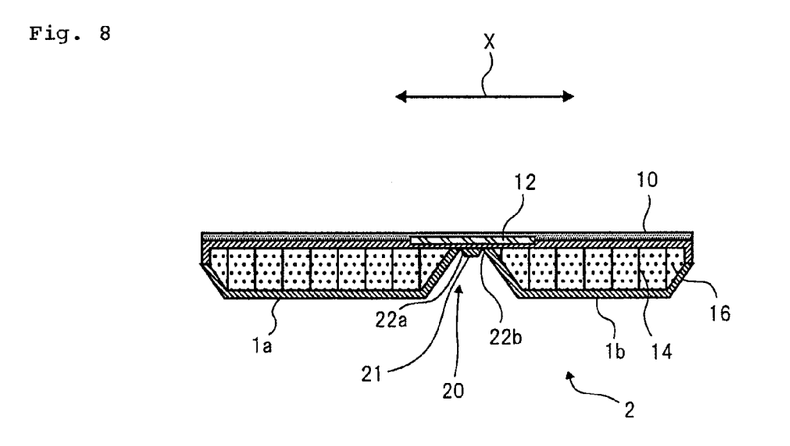
FIG. 8 is a cross-sectional diagram illustrating a board structure for a vehicle according to a second embodiment.
Figure 9:
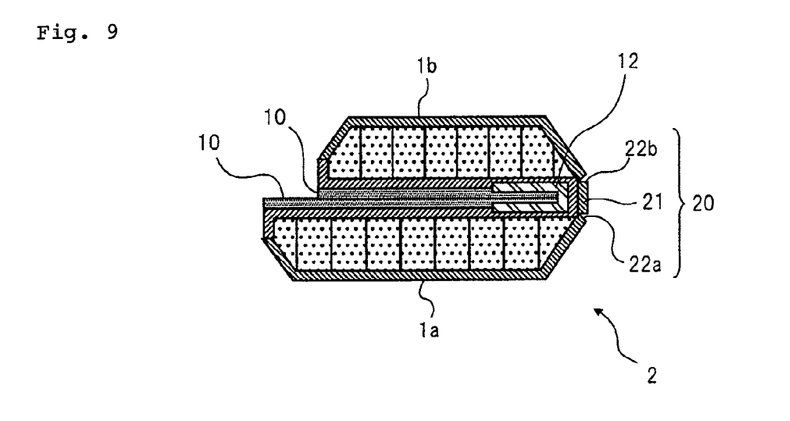
FIG. 9 is a cross-sectional diagram illustrating the board structure for a vehicle according to the second embodiment, with a rear board thereof folded back on a front board thereof with a hinge portion as a pivot axis.

FIG. 8 is a cross-sectional diagram along the X direction of deck board 2 according to a second embodiment. FIG. 9 is a cross-sectional diagram illustrating a state in which rear board 1b of deck board 2 according to the second embodiment is folded back on front board 1a via a hinge portion.

As illustrated in FIG. 8, hinge portion 20 of deck board 2 includes a strip-like hinge base portion 21 formed as a result of joining front side surface member 13 and back side surface member 15 to each other. At opposite ends in the X direction of hinge base portion 21, paired notched grooves 22a and 22b are formed, respectively, in parallel to a longitudinal direction (Y direction), which is the direction of the pivot axis direction of hinge base portion 21. These notched grooves 22a and 22b are formed by notching the outer-side surface of back side surface member 15 from the back side surface member 15 side toward front side surface member 13. Hinge sheet 12 is arranged across two notched grooves 22a and 22b, and at least a part of hinge sheet 12 in the thickness direction thereof is embedded in front side surface member 13.

In deck board 2, rear board 1b pivots relative to front board 1b with notched grooves 22a and 22b of hinge portion 20 as pivot axes. When rear board 1b is folded back on front board 1a, hinge base portion 21 provides a width corresponding to the total thickness of the part of skin member 10 that is in front board 1a and the part of skin member 10 that is in rear board 1b, which are put together. Thus, deck board 2 enables a state in which rear board 1b is in contact with front board 1a to be favorably maintained when deck board 2 is folded via hinge portion 20.

Notched grooves 22a and 22b are formed at the opposite ends of hinge base portion 21 so as to have a cross-sectional V-shape, by means of blade-shaped projections (not illustrated) provided at forming die 3b during pressure forming of deck board 2. As a result of notched grooves 22a and 22b being provided, a failure can be prevented to the greatest possible extent, such as front side surface member 13 and back side surface member 15 being ruptured and deck board 2 thereby being damaged when, after the formation of deck board 2, deck board 2 is folded via hinge portion 20 to provide a crease to hinge portion 20.

Although notched grooves 22a and 22b in this embodiment have a cross-sectional V-shape, the shape of the notched grooves is not limited to this cross-sectional shape, and may be an arbitrary cross-sectional shape such as a cross-sectional U-shape or a cross-sectional squared U shape.

Deck board 2 preferably has a thickness from an extremity (bottom) of notched grooves 22a and 22b in the depth direction thereof to the surface of front side surface member 13 of no more than 1.5 mm, more preferably, no more than 1.0 mm. A thickness of deck board 2 that is smaller than the above upper limit is preferable because when deck board 2 is folded via hinge portion 20, the possibility that a part of glass fiber that is included in front side surface member 13 and back side surface member 15 will be exposed and the outer appearance of deck board 2 will be impaired, can be reduced to the greatest possible extent.

As described above, in deck board 2 according to this embodiment, providing hinge portion 20 that includes hinge base portion 21 and notched grooves 22a and 22b enables a state in which rear board 1b is brought into contact with front board 1a by folding deck board 2 via hinge portion 20 to be favorably maintained. Furthermore, as a result of hinge portion 20 of deck board 2 being provided with notched grooves 22a and 22b, deck board 2 can be prevented from being damaged when providing a crease to hinge portion 20.

A board structure for a vehicle according to the present invention is not limited to deck boards 1 and 2 according to the above-described embodiments, and can be favorably applied to other components including a parcel shelf as long as such other components are board structures that include a hinge portion.

REFERENCE SINGS LIST

1 Deck board (board structure for a vehicle)
1a Front board
1b Rear board
3a, 3b Forming die
10 Skin member
11 Hinge portion
12 Hinge sheet
13 Front side surface member
14 (14a, 14b) Honeycomb structure
15 Back side surface member
16 Thermosetting resin
17 Base material resin sheet
18 Heat-insulating nonwoven fabric
19 Adhesive nonwoven fabric
20 Hinge portion
22a, 22b Notched groove

The invention claimed is:

1. A board structure for a vehicle, said board structure including a core having a honeycomb structure, a front side surface member and a back side surface member between which said core is sandwiched so that said front side surface member and said back side surface member cover openings of hollow spaces of said honeycomb structure of said core, said front side surface member and said back side surface member each containing cured thermosetting resin therein, and a thermosetting resin foamed and charged in said hollow spaces of said core, said board structure comprising:
   first and second boards; and
   a hinge portion pivotably connecting said first and second boards, said hinge portion comprising a linear groove portion and a flexible hinge sheet, said linear groove portion formed on a side of said back side surface member of said board structure and extending between said first and second boards, said flexible hinge sheet provided on an outer side of said front side surface member across said linear groove portion, wherein said front side surface member and said back side surface member are directly joined to each other in an area of said linear groove portion and wherein at least a part of said hinge sheet in a thickness direction thereof is embedded in said front side surface member.

2. The board structure for a vehicle according to claim 1, wherein said hinge sheet includes a flexible base material resin sheet, and a heat-insulating nonwoven fabric provided at a surface of said base material resin sheet on a side opposite to a side facing said front side surface member.

3. The board structure for a vehicle according to claim 2, wherein said base material resin sheet is composed of a thermoplastic resin having a basis weight of no less than 50 g/m2 and no more than 500 g/m2.

4. The board structure for a vehicle according to claim 2, wherein on a surface of said base material resin sheet opposite to the side on which said heat-insulating nonwoven fabric is stacked, an adhesive nonwoven fabric is provided for adherence to said front side surface member.

5. The board structure for a vehicle according to claim 1, wherein said hinge portion includes a notched groove formed at a surface of said back side surface member, in parallel to a direction of a pivot axis of said hinge portion.

6. A method for manufacturing the board structure for a vehicle according to claim 1, said method comprising:
   arranging a core having a honeycomb structure, and a front side surface member and a back side surface member that are impregnated with a thermosetting resin, between a pair of forming dies in such a manner that said core is sandwiched between said front side surface member and said back side surface member so as to cover openings of hollow spaces of said honeycomb structure;
   heating said front side surface member and said back side surface member through the forming dies, thereby foaming and charging said thermosetting resin impregnated in said front side surface member and said back side surface member in said hollow spaces of said core; and
   performing squashing processing on a part of said core impregnated with said thermosetting resin from a side of said back side surface member toward said front side surface member, by means of the forming dies, thereby joining said front side surface member and said back side surface member to each other, thereby forming a hinge portion,
   wherein said hinge portion is formed so as to arrange a flexible hinge sheet across said hinge portion at a position on an outer side of said front side surface member where said hinge portion is formed, and at least a part of said hinge sheet in a thickness direction thereof is embedded in said front side surface member.

* * * * *